Figure 1:
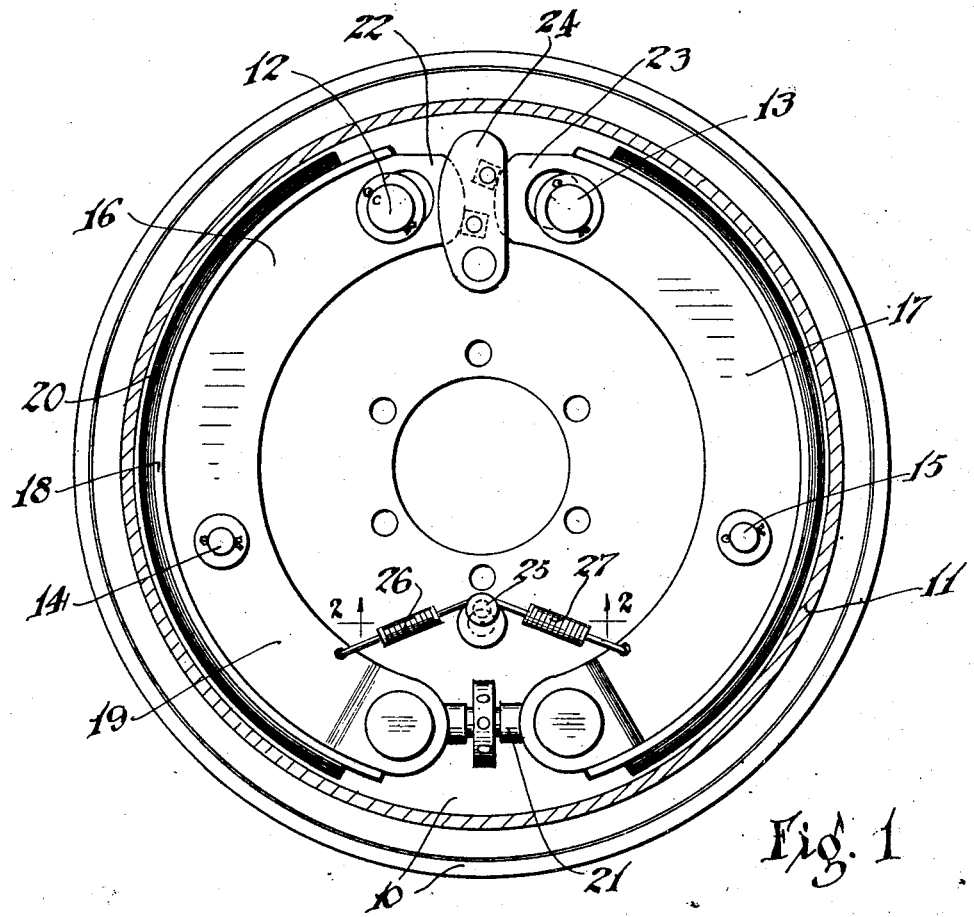

March 14, 1933.  H. W. POEHLMAN  1,901,668

BRAKE

Filed March 23, 1930

INVENTOR
Herbert W. Poehlman
BY
M. W. McConkey
ATTORNEY

Patented Mar. 14, 1933

1,901,668

UNITED STATES PATENT OFFICE

HERBERT W. POEHLMAN, OF SOUTH BEND, INDIANA, ASSIGNOR TO BENDIX BRAKE COMPANY, OF SOUTH BEND, INDIANA, A CORPORATION OF ILLINOIS

BRAKE

Application filed March 26, 1930. Serial No. 438,964.

This invention relates to brakes and more particularly to internal expanding brakes for motor vehicles.

An important problem in brake structures is to improve the smoothness of operation in the brake and to eliminate unbalanced forces and sudden shifts and to provide for a proper clearance between the braking elements and the drum at all times. Heretofore, the wear instant to the operation of the braking elements has produced unbalanced forces due to the operation of the return springs which are not generally adjustable. It is the aim of the present invention to overcome these objections.

In the illustrated embodiment of the invention, means are provided for equalizing the tension of the return springs, so that an equal clearance between the braking elements and the drum may be readily attained.

An object of the invention is to provide means for adjusting the tension on the return springs of the braking elements.

Another object of the invention is to provide means for balancing the braking elements and supporting them in spaced relation to the drum of the brake.

A further object of the invention is to provide a braking mechanism and means associated therewith for equalizing the tension on the springs for returning and supporting the braking elements in the off position.

An additional object of the invention is to provide a brake comprising means for equalizing the tension between the return springs for the braking elements, which is simple and inexpensive in structure, highly efficient in use, positive in action, durable in service and a general improvement in the art.

Figure 2:
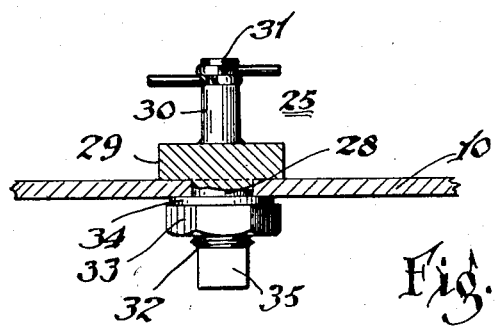

Other objects of the invention will appear from the following description taken in connection with the drawing which forms a part of this specification, and in which:

Figure 1 is a side elevation of a brake mechanism illustrating one embodiment of the invention; and Figure 2 is a sectional view substantially on line 2—2, Figure 1.

Referring to the drawing for more specific details of the invention, 10 represents a backing plate of the conventional type having associated therewith a brake drum 11. The plate 10 has positioned thereon suitable anchors 12 and 13 and steady rests 14 and 15.

Brake shoes 16 and 17 are mounted on the anchors 12 and 13 and steady rests 14 and 15. As shown, the brake shoes are of the conventional type, each having a rim 18 and a flange 19 to which is suitably secured a brake lining 20 adapted to engage the drum 11. The articulating ends of the shoes are secured together by a suitable adjustment screw 21 and the other ends of the shoes are provided with shoulders 22 and 23 between which is positioned a cam 24 operated by a suitable lever, not shown.

Positioned on the backing plate above the adjustment screw 21 and substantially centrally disposed with respect to the articulating ends of the shoes is an eccentric, indicated generally at 25. This eccentric is connected by suitable springs 26 and 27 to the respective shoes, so that the tension on the springs 26 and 27 may be equalized to retain the shoes when in an off position with a proper clearance between the shoes and the drum.

As shown, the eccentric comprises a shaft 28 positioned for rotation in the backing plate 10. The shaft has formed thereon a flange 29 having thereon in an off center position a pin 30 provided with a circumferential groove 31 in which the respective ends of the springs 26 are secured. The shaft is threaded as indicated at 32 to receive a nut 33 by means of which it is securely clamped against the backing plate with a suitable lock washer 34 interposed, and formed on the end of the shaft is a square of polygon head 35, by means of which the eccentric may be rotated to equalize the tension between the springs, so that a uniform clearance between the brake lining and the drum may be easily and quickly attained.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim is new and desire to secure by Letters Patent is:

1. A brake comprising a backing plate, a drum associated therewith, braking elements positioned on the backing plate adapted to co-operate with the drum, springs for returning the braking elements to the off position and means including an eccentric connected between the springs for balancing the tension of the springs.

2. A brake comprising a backing plate, a drum associated therewith, braking elements positioned on the plate for co-operation with the drum, a plurality of springs for returning the braking elements to the off position an eccentric on the backing plate for balancing the tension of the springs and means for locking the eccentric against movement.

3. A brake comprising a backing plate, a drum associated therewith, pivotally connected brake shoes movably positioned on the backing plate for co-operation with the drum, an eccentric positioned on the backing plate adjacent the articulated ends of the shoes and return springs connecting the eccentric to the respective shoes.

4. A brake comprising a backing plate, a drum associated therewith, pivotally connected shoes movably positioned on the backing plate adapted to co-operate with the drum, an eccentric on the backing plate adjacent the articulated ends of the shoes, return springs connecting the respective shoes to the eccentric, means for rotating the eccentric and means for locking the eccentric in a fixed position.

In testimony whereof, I have hereunto signed my name.

HERBERT W. POEHLMAN.